United States Patent
Kim et al.

(10) Patent No.: US 10,889,918 B2
(45) Date of Patent: Jan. 12, 2021

(54) METHOD FOR CONTROLLING STRENGTH OF CARBON NANOTUBE FIBER AGGREGATE

(71) Applicant: LG CHEM, LTD., Seoul (KR)

(72) Inventors: Juhan Kim, Daejeon (KR); Eugene Oh, Daejeon (KR); Ji Eun Kim, Daejeon (KR); Jaehong Lee, Daejeon (KR); Won Jae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 13 days.

(21) Appl. No.: 16/341,652

(22) PCT Filed: Nov. 22, 2017

(86) PCT No.: PCT/KR2017/013358
§ 371 (c)(1),
(2) Date: Apr. 12, 2019

(87) PCT Pub. No.: WO2018/128267
PCT Pub. Date: Jul. 12, 2018

(65) Prior Publication Data
US 2019/0368076 A1    Dec. 5, 2019

(30) Foreign Application Priority Data
Jan. 4, 2017    (KR) .................. 10-2017-0001467

(51) Int. Cl.
*D01F 9/127*    (2006.01)
*D01F 1/09*    (2006.01)
(Continued)

(52) U.S. Cl.
CPC ............. *D01F 9/127* (2013.01); *D01F 1/09* (2013.01); *D01F 1/10* (2013.01); *B82Y 30/00* (2013.01);
(Continued)

(58) Field of Classification Search
CPC ... D01F 9/127; D01F 1/09; D01F 1/10; D01F 9/12; B82Y 30/00; C01B 32/158;
(Continued)

(56) References Cited

U.S. PATENT DOCUMENTS 9,315,385 B2    4/2016    Arendt et al.
9,556,542 B2    1/2017    Oh et al.
(Continued)

FOREIGN PATENT DOCUMENTS

EP    2857354 A1    4/2015
EP    3133190 A1    2/2017
(Continued)

OTHER PUBLICATIONS

Lee, et al., Synthesis of carbon nanotube fibers using the direct spinning process based on Design of Experiment (DOE), Carbon 2016; 100: 647-655 (Year: 2016).*
(Continued)

*Primary Examiner* — Daniel C. McCracken
(74) *Attorney, Agent, or Firm* — Dentons US LLP

(57) ABSTRACT

The present invention relates to a method for controlling the strength of a carbon nanotube fiber aggregate, wherein the strength of the carbon nanotube fiber aggregate can be improved by controlling the molar ratio of the carbon source to reducing gas.

10 Claims, 1 Drawing Sheet

(51) Int. Cl.
   *D01F 1/10* (2006.01)
   *B82Y 30/00* (2011.01)

(52) U.S. Cl.
   CPC .. *D10B 2101/122* (2013.01); *D10B 2401/063* (2013.01); *D10B 2401/16* (2013.01)

(58) Field of Classification Search
   CPC ........ D10B 2101/122; D10B 2401/063; D10B 2401/16; D01D 5/00
   See application file for complete search history.

(56) References Cited

U.S. PATENT DOCUMENTS

| | | |
|---|---|---|
| 2009/0186223 A1 | 7/2009 | Seito et al. |
| 2011/0104490 A1 | 5/2011 | Kambara et al. |
| 2015/0240391 A1 | 8/2015 | Oh et al. |
| 2016/0200577 A1 | 7/2016 | Cornwell et al. |
| 2017/0044689 A1 | 2/2017 | Lee et al. |
| 2017/0073232 A1 | 3/2017 | Noyes |
| 2018/0044819 A1 | 2/2018 | Inoue et al. |

FOREIGN PATENT DOCUMENTS

| | | |
|---|---|---|
| EP | 3263753 A1 | 1/2018 |
| JP | 5699387 B2 | 4/2015 |
| JP | 2016-160539 A | 9/2016 |
| KR | 10-2008-0113242 A | 12/2008 |
| KR | 10-2012-0094416 A | 8/2012 |
| KR | 10-1309730 B1 | 9/2012 |
| KR | 10-2013-0134102 A | 12/2013 |
| KR | 10-1421070 B1 | 7/2014 |
| KR | 10-2014-0142838 A | 12/2014 |
| KR | 10-2014-0147004 A | 12/2014 |
| KR | 10-1531023 B1 | 6/2015 |
| KR | 10-2015-0120250 A | 10/2015 |
| KR | 10-1596088 B1 | 2/2016 |
| KR | 10-1602685 B1 | 3/2016 |
| KR | 10-2016-0146256 A | 12/2016 |

OTHER PUBLICATIONS

Lee, et al.: "Synthesis of carbon nanotube fibers using the direct spinning process based on Design of Experiment (DOE)", XP029418452, Carbon, Elsevier, vol. 100, Jan. 20, 2016, pp. 647-655.

* cited by examiner

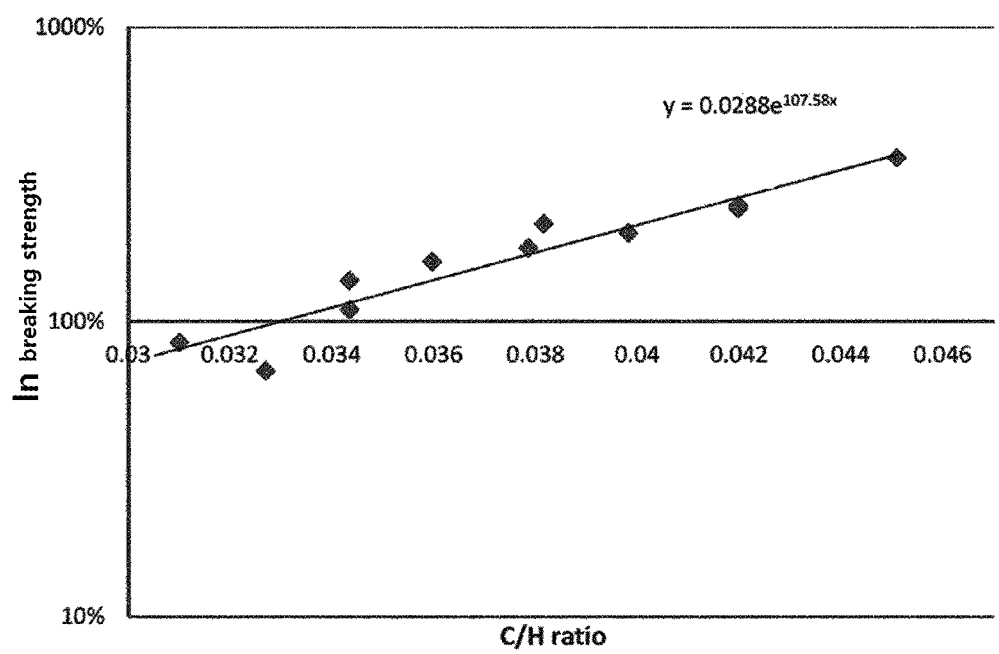

METHOD FOR CONTROLLING STRENGTH OF CARBON NANOTUBE FIBER AGGREGATE

This application is a National Phase entry pursuant to 35 U.S.C. § 371 of International Application No. PCT/KR2017/013358 filed Nov. 22, 2017 and claims the benefit of priority to Korean Patent Application No. 10-2017-0001467, filed on Jan. 4, 2017, the entire disclosures of which are incorporated herein by reference.

FIELD

The present invention relates to a method of controlling strength of carbon nanotube fiber aggregate.

BACKGROUND

Carbon nanotube (CNT), which is an allotrope of carbon, has a diameter of several to several tens of nanometers and a length of several hundreds of micrometers to several millimeters. Such CNT have been reported in the journal Nature in 1991 by Dr. Iijima and has been studied in a variety of fields due to its excellent thermal, electrical and physical properties and high aspect ratio. The inherent characteristics of such carbon nanotubes are attributed to the $sp^2$ bond of carbon. The carbon nanotubes are stronger than iron, are lighter than aluminum, and exhibit electrical conductivity similar to that of metals. The carbon nanotubes can be classified as single-wall carbon nanotube (SWNT), double-wall carbon nanotube (DWNT) and multi-wall carbon nanotube (MWNT), according to the number of walls of the nanotube. Also, carbon nanotubes can be classified into zigzag, armchair, and chiral structures according to their asymmetry/chirality.

Coagulation spinning, liquid-crystalline spinning, and direct spinning are typical examples of methods for fiberizing carbon nanotubes.

Coagulation spinning is a method for fiberizing carbon nanotubes in which a dispersing solution containing carbon nanotubes and dispersants is injected into a polymer solution so that the dispersants in the dispersing solution are transferred into the polymer solution and the sites are substituted by the polymer to serve as a binder.

Liquid-crystalline spinning is a method for fiberizing carbon nanotubes using the propensity of carbon nanotube solutions to form liquid crystals under specific conditions. This method is advantageous in that it can produce carbon nanotube fibers with good orientation, but is disadvantageous in that the spinning speed is very slow and the conditions for forming liquid crystals of carbon nanotubes are strict.

Direct spinning is a method in which carbon nanotubes are synthesized in a heating furnace by injecting a liquid carbon source and a catalyst together with a carrier gas into an upper inlet of a high-temperature heating furnace which is vertically erected, and the carbon nanotube fiber aggregates, which go down to bottom of the heating furnace together with the carrier gas, are wound inside or outside the heating furnace to obtain fibers.

CNT aggregates have excellent physical strength, electrical conductivity, and thermal conductivity, and many studies have been conducted to improve these properties. In order to improve the physical strength, breaking strength of the CNT aggregate can be improved. In order to improve the breaking strength, physical post-treatment and chemical post-treatment can be generally carried out. However, it is important to prepare a high-strength CNT aggregate prior to such a post-treatment process, and it is necessary to study a method for improving the strength of the CNT aggregate by appropriately controlling the source forming such CNT aggregate.

SUMMARY

An object of the present invention is to provide a method for improving the strength of a carbon nanotube fiber aggregate.

In order to solve the above problem, the present invention provides a method for producing a carbon nanotube fiber aggregate by spinning a raw material containing a carbon source in the presence of a carrier gas containing a reducing gas, wherein the molar ratio of the carbon source to the reducing gas (carbon source/reducing gas) is adjusted to 0.03 or more to control the strength of the carbon nanotube fiber aggregate.

According to one embodiment, the value of the elongation at break may increase as the molar ratio of the carbon source to the reducing gas (carbon source/reducing gas) is increased.

According to one embodiment, the molar ratio of the carbon source to the reducing gas (carbon source/reducing gas) may satisfy the following Equation 1 or Equation 2:

$$y=0.0288e^{107.58x} \quad \text{[Equation 1]}$$

$$0.0288e^{107.58x}-0.7 \le y \le 0.0288e^{107.58x}+0.3 \quad \text{[Equation 2]}$$

wherein, y is the elongation at break, and x is the molar ratio of the carbon source to the reducing gas.

According to one embodiment, the reducing gas may comprise hydrogen gas, ammonia gas, or a mixed gas thereof.

According to one embodiment, the carrier gas may further comprise an inert gas.

According to one embodiment, the raw material for spinning may be a liquid or gaseous carbon compound having the catalyst precursor dispersed therein.

The liquid or gaseous carbon compound may comprise at least one selected from the group consisting of methane, ethylene, acetylene, methyl acetylene, vinyl acetylene, ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride and pentane.

According to one embodiment, the catalyst precursor may comprise at least one selected from the group consisting of iron, nickel, cobalt, platinum, ruthenium, molybdenum, vanadium, and oxides thereof.

According to one embodiment, the catalyst precursor may be in a metallocene form.

According to one embodiment, the method of the present invention, carbon nanotubes are formed from a raw material for spinning and continuously fused to spin carbon nanotube fibers directly.

According to one embodiment, the feed rate of the raw material for spinning may be 10 to 500 ml/min, and the feed rate of the carrier gas may be 1 to 5 L/min.

According to another embodiment of the present invention, there is provided a carbon nanotube fiber aggregate produced by the above-described method.

Other specific embodiments of the present invention are included in the following detailed description.

The present invention can improve the strength of the carbon nanotube fiber aggregate by a simple process of controlling the molar ratio of a carbon source and a reducing gas in a carrier gas which are introduced when producing a carbon nanotube aggregate.

The carbon nanotube fiber aggregate produced by the method according to the present invention is expected to be applied to various fields such as a reinforcing material for a multifunctional composite material, a strain and damage detector using a stable repetitive piezoresistive effect, a transmission line using high conductivity, electrochemical devices using a high specific surface area, excellent mechanical properties and electrical conductivity, for example, microelectrode materials for sensing biomaterials, supercapacitors, and actuators.

BRIEF DESCRIPTION OF THE DRAWING

FIG. 1 is a graph showing elongation at break of a carbon nanotube fiber aggregate in accordance with molar ratio of carbon source to reducing gas.

DETAILED DESCRIPTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description, well-known functions or constructions are not described in detail if it is determined that they may obscure the gist of the present invention.

The term "aggregate" as used herein may be described interchangeably with "agglomerate" and may be understood to mean a collection of singular objects or components.

The term "introducing" as used herein may be described interchangeably with "inflow", "injection" herein, and may be understood to mean flowing or inputting liquid, gas or heat, etc. into the places in need thereof.

The term "carbon nanotube fiber" in the present disclosure refers to both of carbon nanotubes grown in a fiber form and a plurality of carbon nanotubes fused in a fiber form.

Hereinafter, the method for controlling strength of the carbon nanotube fiber aggregate according to the embodiment of the present invention will be described in detail.

In the present invention, to control strength of a carbon nanotube fiber aggregate, a carbon nanotube fiber aggregate is prepared by controlling the molar ratio of a carbon source in a raw material for spinning to hydrogen gas in a carrier gas to be introduced.

The present invention provides a method for producing a carbon nanotube fiber aggregate by spinning a raw material containing a carbon source in the presence of a carrier gas containing a reducing gas, wherein the molar ratio of the carbon source to the reducing gas (carbon source/reducing gas) is adjusted to 0.03 or more to control the strength of the carbon nanotube fiber aggregate.

According to one embodiment, the value of the elongation at break may increase as the molar ratio of the carbon source to the reducing gas (carbon source/reducing gas) is increased. When the molar ratio is 0.03 or more, the natural logarithmic value of the breaking strength is 100% or more. For example, the molar ratio may be 0.033 or more and 0.05 or less.

According to one embodiment, the molar ratio of the carbon source to the reducing gas (carbon source/reducing gas) may satisfy the following Equation 1 or Equation 2:

$$y=0.0288e^{107.58x} \quad \text{[Equation 1]}$$

$$0.0288e^{107.58x}-0.7 \leq y \leq 0.0288e^{107.58x}+0.3 \quad \text{[Equation 2]}$$

wherein, y is the elongation at break, and x is the molar ratio of the carbon source to the reducing gas.

According to one embodiment, the reducing gas may comprise hydrogen gas, ammonia gas, or a mixed gas thereof.

The carrier gas may further include an inert gas. The inert gas may include a gas containing nitrogen, helium, neon, argon, krypton, xenon, radon or a mixture thereof. The inert gas is chemically stable and has a nature of not exchanging or sharing electrons, and therefore it can serve to flow and migrate carbon nanotubes due to gas inflow without reacting with the carbon nanotubes (CNT).

Techniques for producing carbon nanotube fibers include solution spinning, array spinning, aerogel spinning, film twisting/rolling, and the like. According to one embodiment, the present invention may include a process of directly spinning carbon nanotube fibers or ribbons from carbon nanotubes formed in a reactor immediately after introduction of a raw material for spinning by chemical vapor deposition (CVD).

The direct spinning is a process of synthesizing carbon nanotubes in a heating furnace by introducing a raw material for spinning in which a catalyst is added, to a carbon source, together with a carrier gas into a vertical furnace at a constant rate, and fusing them to continuously produce carbon nanotube fibers which are composed only of carbon nanotubes.

The reaction zone of the high-temperature furnace is a zone in which a carbon source forms carbon nanotubes using a graphenization catalyst and at the same time forms a continuous aggregate. When the raw material for spinning is reacted in the reaction zone, carbon nanotubes are synthesized, and the synthesized carbon nanotubes grow or fuse together to be continuously aggregated, and thus a cylindrical carbon nanotube fiber aggregate can be formed. The carbon nanotube fibers thus formed can be wound using a winding means. The winding speed may influence that the carbon nanotubes in the fibers are oriented in the fiber axis direction and may be a factor for determining the thermal, electrical, and physical properties of the carbon nanotube fibers. For example, the winding speed may range from 5 to 100 rpm. If the winding speed is too high, the carbon nanotube fibers may be broken, resulting in difficulty in continuous production.

The temperature of the reaction zone may be from 1,000 to 3000° C. Preferably it may be from 1,000 to 2,000° C., from 1,000 to 1,500° C., or from 1,000 to 1,300° C., and more preferably from 1,150 to 1,250° C. If it is less than 1000° C., carbon nanotube fibers may not be formed. If the temperature is more than 3000° C., carbon nanotubes may be vaporized. Therefore, the above-described range is preferable.

The raw material for spinning containing a carbon source may be carbonized and graphitized while flowing from the upper end to the lower end of the heating furnace or from the lower end to the upper end of the heating furnace to form carbon nanotube fibers composed of continuous sock or aggregates of carbon nanotubes.

The raw material for spinning may be prepared by dispersing a catalyst or a catalyst precursor in a carbon compound. The catalyst or the catalyst precursor may be mixed in an amount of 0.5 to 10 wt %, 1 to 5 wt %, or 1.5 to 4 wt %, based on the carbon compound. If an excess catalyst or catalyst precursor is used in comparison with the carbon source, the catalyst may act as an impurity, which makes it difficult to obtain high-purity carbon nanotube fibers, and rather it may become a factor that hinders the thermal, electrical, and physical properties of the carbon nanotube fibers.

According to one embodiment, the carbon compound may be in a liquid or gas phase. The carbon compound as a carbon source is diffused to a catalyst and thus synthesized into carbon nanotubes. It is used in consideration of molecular weight distribution, concentration, viscosity, surface tension, dielectric constant and properties of the solvent used.

The liquid or gaseous carbon compound may comprise at least one selected from the group consisting of methane, ethylene, acetylene, methyl acetylene, vinyl acetylene, ethanol, methanol, propanol, acetone, xylene, chloroform, ethyl acetic acid, diethyl ether, polyethylene glycol, ethyl formate, mesitylene, tetrahydrofuran (THF), dimethylformamide (DMF), dichloromethane, hexane, benzene, carbon tetrachloride and pentane.

Specifically, the liquid carbon compound may comprise at least one selected from the group consisting of ethanol, methanol, propanol, acetone, xylene, chloroform, ethyl acetate, diethyl ether, polyethylene glycol, ethyl formate, mesitylene, tetrahydrofuran (THF) dimethylformamide (DMF), dichloromethane, hexane, benzene, carbon tetrachloride, and pentane. Preferably, it may comprise at least one selected from the group consisting of ethanol ($C_2H_5OH$), xylene ($C_8H_{10}$), diethyl ether [$(C_2H_5)_2O$], polyethylene glycol [$H—(O—CH_2—CH_2)_n—OH$], 1-propanol ($CH_3CH_2CH_2OH$), acetone ($CH_3OCH_3$), ethyl formate ($CH_3CH_2COOH$), benzene ($C_6H_6$), hexane ($C_6H_{14}$), and mesitylene [$C_6H_3(CH_3)_3$].

The gaseous carbon compound may comprise at least one selected from the group consisting of methane, ethylene, acetylene, methyl acetylene, and vinyl acetylene.

In the present invention, the catalyst or the catalyst precursor may comprise at least one selected from the group consisting of iron, nickel, cobalt, platinum, ruthenium, molybdenum, vanadium, and oxides thereof, but is not limited thereto. The catalyst may be in the form of nanoparticle. Preferably, it may be in a metallocene form such as ferrocene, which is a compound containing iron, nickel, cobalt, etc.

In the present invention, the raw material for spinning may further comprise a catalytic activator. In general, carbon nanotubes are synthesized by diffusion of carbon to the catalyst in a molten state, followed by precipitation of the carbon nanotubes. The catalyst activator is used as a promoter in the synthesis of carbon nanotubes to increase a diffusion rate of carbon, thereby allowing carbon nanotubes to be synthesized in a short time.

As the catalytic activator, for example, element sulfur and a sulfur-containing compound can be used. Specific examples thereof include sulfur-containing aliphatic compounds such as methylthiol, methylethylsulfide, dimethylthioketone and the like; sulfur-containing aromatic compounds such as phenylthiol, diphenylsulfide and the like; sulfur-containing heterocyclic compounds such as pyridine, quinoline, benzothiophene, thiophene and the like; elemental sulfur, preferably sulfur or thiophene, and more preferably sulfur. Sulfur reduces the melting point of the catalyst and removes the amorphous carbon, allowing synthesis of high purity carbon nanotubes at low temperature.

According to a preferred embodiment of the present invention, the catalyst precursor and the catalytic activator may be in a liquid phase for the liquid carbon compound, and may be in a gas phase for the gaseous carbon compound. Therefore, the catalyst precursor or the catalytic activator can be melted and then injected in a liquid state into the liquid carbon compound, or it can be vaporized and then injected in a gaseous state into the gaseous carbon compound.

The catalyst precursor is a substance that is not itself included in the catalytic cycle, but transforms into an active catalyst (or produces an active catalyst) in the system of the catalytic reaction. After the catalyst precursor forms a catalyst, CNT can be synthesized.

In the present invention, the feed rate of the raw material for spinning supplied to the reaction zone may be 10 to 500 sccm, preferably 50 to 150 sccm or 80 to 120 sccm.

Further, the flow rate of the carrier gas injected into the reaction zone may be determined within a range satisfying the condition of the above-mentioned Equation 1. For example, in the case of hydrogen gas it may be suitably selected in the range of 1 to 5 L/min or 1.5 to 3 L/min.

According to another embodiment, the carrier gas may be injected at a linear velocity of 1 to 5 cm/sec, preferably at a linear velocity of 1.5 to 3 cm/sec or 1.8 to 2.5 cm/sec. The linear velocity of the carrier gas to be injected may vary depending on the kind of the carrier gas, the size of the reactor, the type of the catalyst, and the like.

Hereinafter, embodiments of the present invention will be described in detail so that those skilled in the art can easily carry out the present invention. The present invention may, however, be embodied in many different forms and should not be construed as limited to the embodiments set forth herein.

Example and Comparative Example: Production of Carbon Nanotube Fiber Aggregates

A ferrocene catalyst precursor and a sulfur catalyst activator were vaporized and injected into a cylindrical reactor at a rate of 0.5 g/hr and 0.135 g/hr, respectively. Methane as a carbon compound and a carrier gas (hydrogen) were flowed into the upper end of the cylindrical reactor at a temperature of 1200° C. at a rate of 115 to 152.5 ml/min and 1.8 to 2.2 L/min, respectively. Then, carbon nanotube fiber aggregates were discharged through the output at the lower end of the reactor and were wound by a winder composed of bobbin. The molar ratio of methane to hydrogen gas is shown in Table 1 below.

TABLE 1

| | Molar ratio of $CH_4$ to $H_2$ |
|---|---|
| Example 1 | 0.034 |
| Example 2 | 0.036 |
| Example 3 | 0.040 |
| Example 4 | 0.042 |
| Example 5 | 0.046 |
| Example 6 | 0.030 |
| Example 7 | 0.032 |
| Comparative Example 1 | 0.028 |

Experimental Example 1: Evaluation of Elongation at Break

In order to evaluate elongation at break for the carbon nanotube fiber aggregate according to Examples and Comparative Example, the measurement values of FAVIMAT (measurement equipment for tensile strength) are shown in the graph of FIG. 1. Tensile strength was measured using FAVIMAT+ instrument from Textecho, the load cell range of 210 cN and the gauge length of 2.0 cm, and the experiment was conducted at a speed of 2 mm/min.

As shown in FIG. 1, it can be seen that when the molar ratio (x) of the carbon source to the reducing gas is 0.030 or more, the elongation at break (y) increases according to the following Equation 1 or 2, but when the molar ratio of the carbon source/reducing gas was 0.028, the breaking strength of the carbon nanotube fiber aggregate became so weak that measurement was difficult.

$$y=0.0288e^{107.58x} \quad \text{[Equation 1]}$$

$$0.0288e^{107.58x}-0.7 \leq y \leq 0.0288e^{107.58x}+0.3 \quad \text{[Equation 2]}$$

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention is defined by the claims appended hereto and their equivalents.

What is claimed is:

1. A method for producing a carbon nanotube fiber aggregate by spinning a raw material containing a carbon source in the presence of a carrier gas containing a reducing gas, wherein the molar ratio of the carbon source to the reducing gas (carbon source/reducing gas) is 0.03 or more and 0.05 or less, and
wherein the molar ratio of the carbon source to the reducing gas (carbon source/reducing gas) satisfies the following Equation 1 or Equation 2:

$$y=0.0288e^{107.58x} \quad \text{(Equation 1)}$$

$$0.0288e^{107.58x}-0.7 \leq y \leq 0.0288e^{107.58x}+0.3 \quad \text{(Equation 2)}$$

wherein, y is the elongation at break, and x is the molar ratio of the carbon source to the reducing gas,
to control the strength of the carbon nanotube fiber aggregate,
wherein the reducing gas comprises hydrogen gas, ammonia gas, or a mixed gas thereof.

2. The method for producing a carbon nanotube fiber aggregate according to claim 1, wherein the value of elongation at break increases as the molar ratio of the carbon source to the reducing gas (carbon source/reducing gas) is greater.

3. The method for producing a carbon nanotube fiber aggregate according to claim 1, wherein the carrier gas comprises an inert gas.

4. The method for producing a carbon nanotube fiber aggregate according to claim 1, wherein the raw material for spinning is a liquid or gaseous carbon compound having the catalyst precursor dispersed therein.

5. The method for producing a carbon nanotube fiber aggregate according to claim 4, wherein the liquid or gaseous carbon compound comprises at least one selected from the group consisting of methane, ethylene, acetylene, methyl acetylene, vinyl acetylene, ethanol, methanol, propanol, acetone, xylene, chloroform, ethyl acetate, diethyl ether, polyethylene glycol, ethyl formate, mesitylene, tetrahydrofuran (THF), dimethylformamide (DMF), dichloromethane, hexane, benzene, carbon tetrachloride and pentane.

6. The method for producing a carbon nanotube fiber aggregate according to claim 4, wherein the catalyst precursor comprises at least one selected from the group consisting of iron, nickel, cobalt, platinum, ruthenium, molybdenum, vanadium and oxides thereof.

7. The method for producing a carbon nanotube fiber aggregate according to claim 6, wherein the catalyst precursor is in a metallocene form.

8. The method for producing a carbon nanotube fiber aggregate according to claim 1, wherein carbon nanotubes are formed from a raw material for spinning and continuously fused to spin carbon nanotube fibers directly.

9. The method for producing a carbon nanotube fiber aggregate according to claim 1, wherein a feed rate of the raw material for spinning is 10 to 500 ml/min, and a feed rate of the carrier gas is 1 to 5 L/min.

10. A carbon nanotube fiber aggregate produced by the method of claim 1.

* * * * *